United States Patent
Wagner et al.

(10) Patent No.: US 10,184,473 B1
(45) Date of Patent: Jan. 22, 2019

(54) NON-CONTRACTING BIDIRECTIONAL SEAL FOR GASEOUS ROTARY MACHINES

(71) Applicants: Jerald G. Wagner, Myakka City, FL (US); David R. Markham, Orlando, FL (US)

(72) Inventors: Jerald G. Wagner, Myakka City, FL (US); David R. Markham, Orlando, FL (US)

(73) Assignee: MAINSTREAM ENGINEERING CORPORATION, Rockledge, FL (US)

( * ) Notice: Subject to any disclaimer, the term of this patent is extended or adjusted under 35 U.S.C. 154(b) by 132 days.

(21) Appl. No.: 15/255,617

(22) Filed: Sep. 2, 2016

(51) Int. Cl.
| | |
|---|---|
| F01C 1/16 | (2006.01) |
| F03C 2/00 | (2006.01) |
| F03C 4/00 | (2006.01) |
| F04C 2/00 | (2006.01) |
| F04C 27/00 | (2006.01) |
| F04C 18/16 | (2006.01) |
| F01D 11/02 | (2006.01) |
| F16J 15/447 | (2006.01) |

(52) U.S. Cl.
CPC ............ *F04C 27/009* (2013.01); *F04C 18/16* (2013.01); *F01D 11/02* (2013.01); *F04C 2240/30* (2013.01); *F04C 2240/60* (2013.01); *F04C 2270/17* (2013.01); *F16J 15/447* (2013.01); *F16J 15/4472* (2013.01)

(58) Field of Classification Search
CPC .......... F04C 18/16; F04C 2/16; F04C 27/009; F04C 2240/30; F04C 2240/60; F04C 2270/17; F01D 11/02; F16J 15/447; F16J 15/4772; F16J 15/4776; F16J 15/4472; F16J 15/4476

USPC ...... 418/201.1, 102, 104, 140–142; 277/411, 277/412, 303

See application file for complete search history.

(56) References Cited

U.S. PATENT DOCUMENTS

| | | | |
|---|---|---|---|
| 4,963,041 A | 10/1990 | Sowards | |
| 5,554,020 A * | 9/1996 | Rao | F01C 21/104 418/178 |
| 6,135,641 A | 10/2000 | Smith | |
| 6,367,807 B1 * | 4/2002 | Rockwood | F16J 15/4478 277/412 |
| 8,340,489 B2 | 12/2012 | Sarmaala | |
| 2006/0153698 A1 | 7/2006 | Makino et al. | |

FOREIGN PATENT DOCUMENTS

JP    63285279 A   *   11/1988   ............ F04C 27/009

OTHER PUBLICATIONS

United States Air Force Contract AF 33(616)-7006.

\* cited by examiner

*Primary Examiner* — Theresa Trieu

(57) ABSTRACT

A rotary device has at least one seal arrangement between inner and outer components to constrain fluid flow there between. The seal arrangement has a smooth surface and an opposing surface with a plurality of grooves and lands along a length of the at least one seal with the lands are separated from the smooth surface by a predetermined gap. The grooves have a bottom surface substantially parallel to the smooth surface. The width of the lands is between about 125% to 145% of the width of the grooves. The groove depth is between about 30% to 50% of the width of the grooves. A corner radius between the bottom surface of the grooves and side walls of the grooves is between about 25% to 100% of the depth of the grooves.

10 Claims, 5 Drawing Sheets

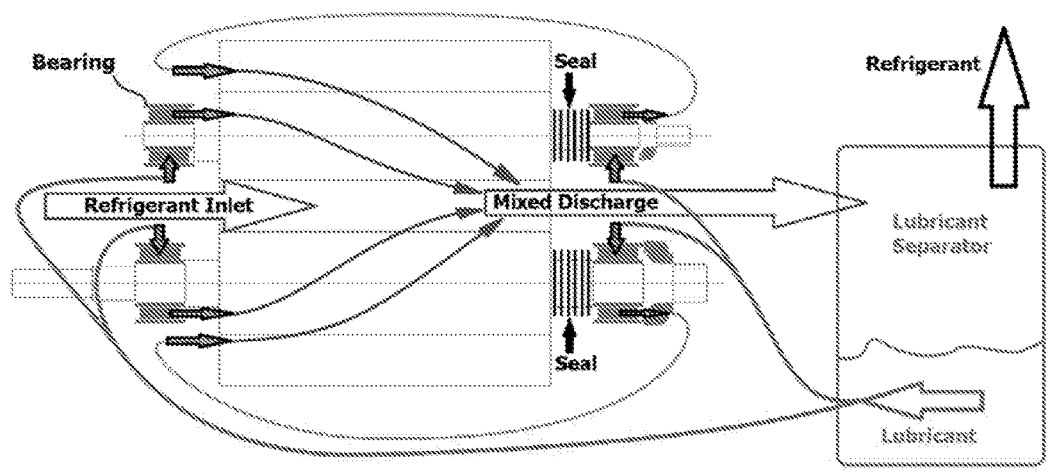
Figure 1: PRIOR ART
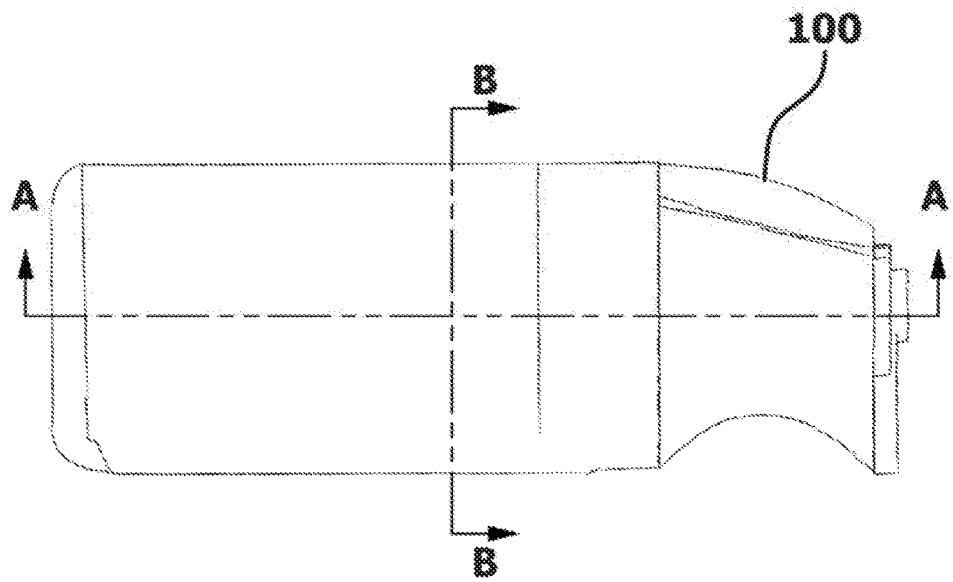
Figure 2

NON-CONTRACTING BIDIRECTIONAL SEAL FOR GASEOUS ROTARY MACHINES

GOVERNMENT LICENSE RIGHTS

The U.S. Government has a paid-up license in this invention and the right in limited circumstances to require the patent owner to license others on reasonable terms as may be provided for by the terms of Contract Number: W31P4Q-13-C-0049_CFMH, Contract Title: Vapor-Liquid Pump for Mixed Phase Refrigerant, awarded by the U.S. Army Aviation and Missile Command-Redstone.

CROSS REFERENCE TO RELATED APPLICATIONS

This application is related to U.S. patent application Ser. No. 15/255,200, filed Sep. 2, 2016, 2016, entitled "Improved Rotary Machine Providing Thermal Expansion Compensation, And Method For Fabrication Thereof" in the name of Jerald G. Wagner and to U.S. patent application Ser. No. 15/255,657, filed Sep. 2, 2016, entitled "An Improved Passage Arrangement For Cooling, Lubricating And Reducing The Size Of Rotary Machines" in the name of Jerald G. Wagner.

BACKGROUND AND SUMMARY OF THE INVENTION

The present invention relates to rotating machinery such as a screw type compressor or supercharger. More specifically, the present invention is directed to an effective seal that is easy to manufacture using common manufacturing techniques and allows axial motion without constraint where an interface without steps is used.

Gaseous screw compressors of generally known configuration (FIG. 2) are considered flooded when the lubricant and gas streams mix within the compressor as shown in the flow schematic represented in FIG. 1. The mix is compressed to high pressure at the discharge end of the screws and exits the compressor. Lubricant and gas are then separated, and only the separated lubricant is reintroduced to bearings on the compressor screw shaft very near to where the mix was compressed to high pressure. The process is continuous, so a high-pressure mix is always present at the bearings. For lubricant to flow into a bearing, that bearing must, of course, be in a lower pressure region than the region where the mix was separated. This is conventionally accomplished by routing the bearing lubrication drain path to the low-pressure side of the compressor, adding a restrictor in the lubricant feed line, and most importantly introducing a shaft seal to block high pressure at the discharge end of the screws from directly flowing into the bearing and lubricant drain. Drained lubricant is reintroduced at the compressor inlet. Without a shaft seal, the high discharge pressure would have a direct path to the compressor inlet. This shaft seal is thus critical to compressor efficiency and lubrication system function.

Our invention is the discovery of a series of shapes or configurations that allows a tight seal between rotating components of different speeds to be achieved without the need for any contact. One advantage of our invention is that only one component surface needs to be smooth, thereby greatly simplifying machining operations and reducing costs. The mating surface of the present invention has a series of negative features of basic geometry, also further simplifying machining operations. The combination of smooth surface(s), when arranged parallel to the rotation axis, and mating negative features allows significant axial motion between the components without constraint while creating a highly effective seal that can be symmetrically shaped to create a seal from either direction. The effectiveness of this seal is not diminished when used in either a stepped configuration or a tapered configuration.

BRIEF DESCRIPTION OF THE DRAWINGS

Other objects, advantages and novel features of the present invention will become apparent from the following detailed description when considered in conjunction with the accompanying drawings herein.

FIG. 1 shows the oil flow path, seals and bearings for a flooded conventional screw compressor.

FIG. 2 is an elevational view of a screw compressor of generally known construction that uses the principles on our invention.

DETAILED DESCRIPTION OF THE DRAWINGS

Figure 3:
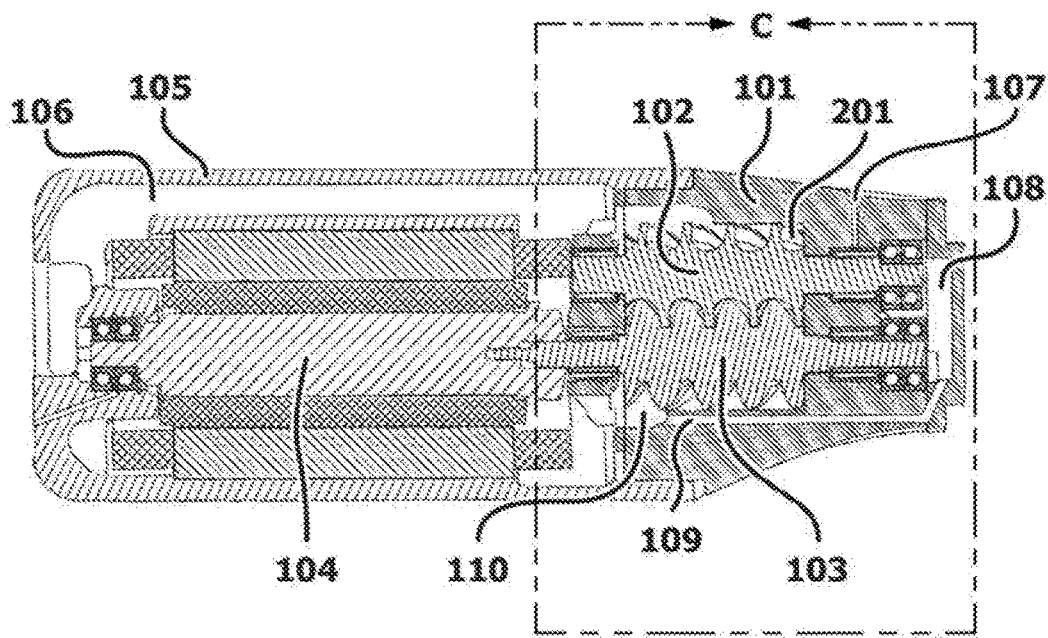
FIGS. 3 and 4 are, respectively, cross-sectional elevational views of a screw compressor showing the high discharge pressure location (discharge port is located out of this view), seal, bearing, and lubrication return path to the compressors inlet according to our invention where the top right bearing shows a direct port for lubricant and the other bearings each have a similar port that are not shown for conciseness and simplicity.
Figure 4:
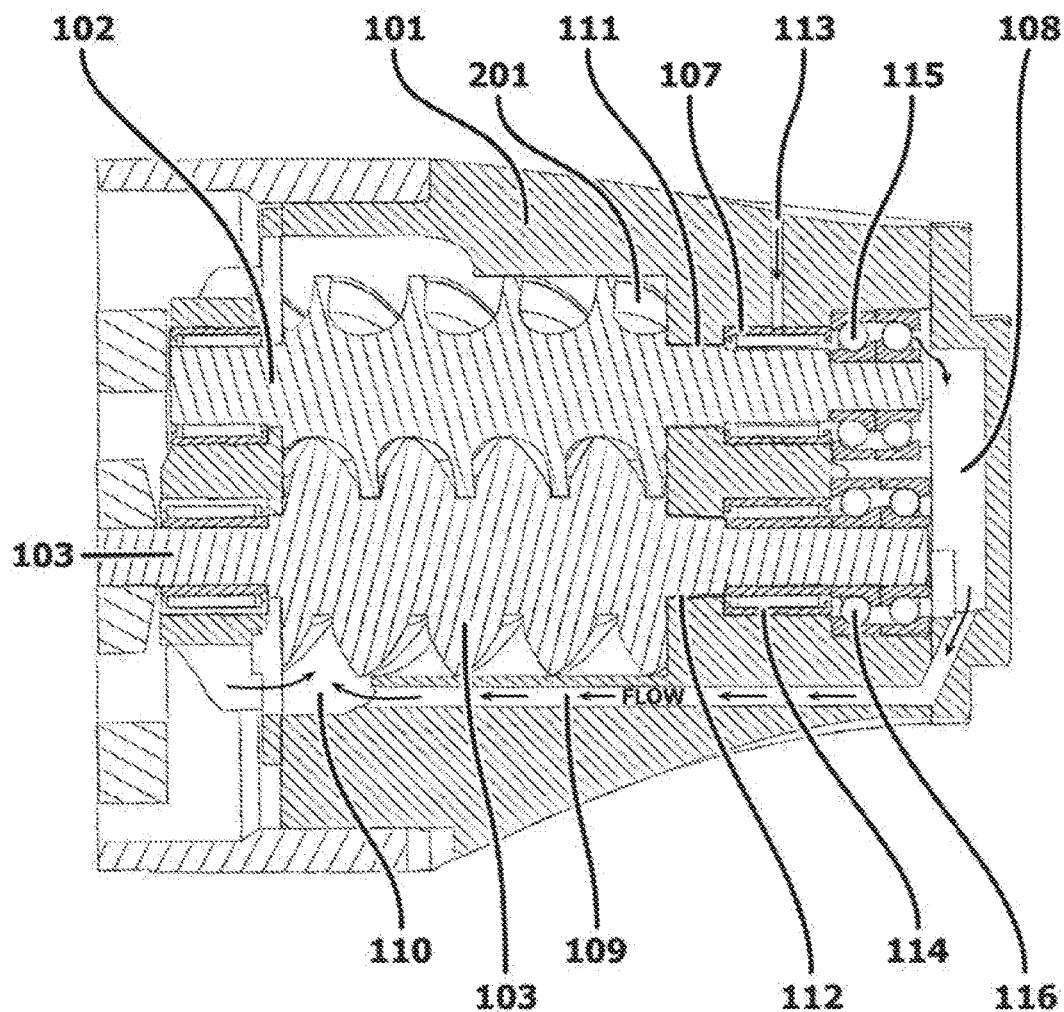
Figure 5:
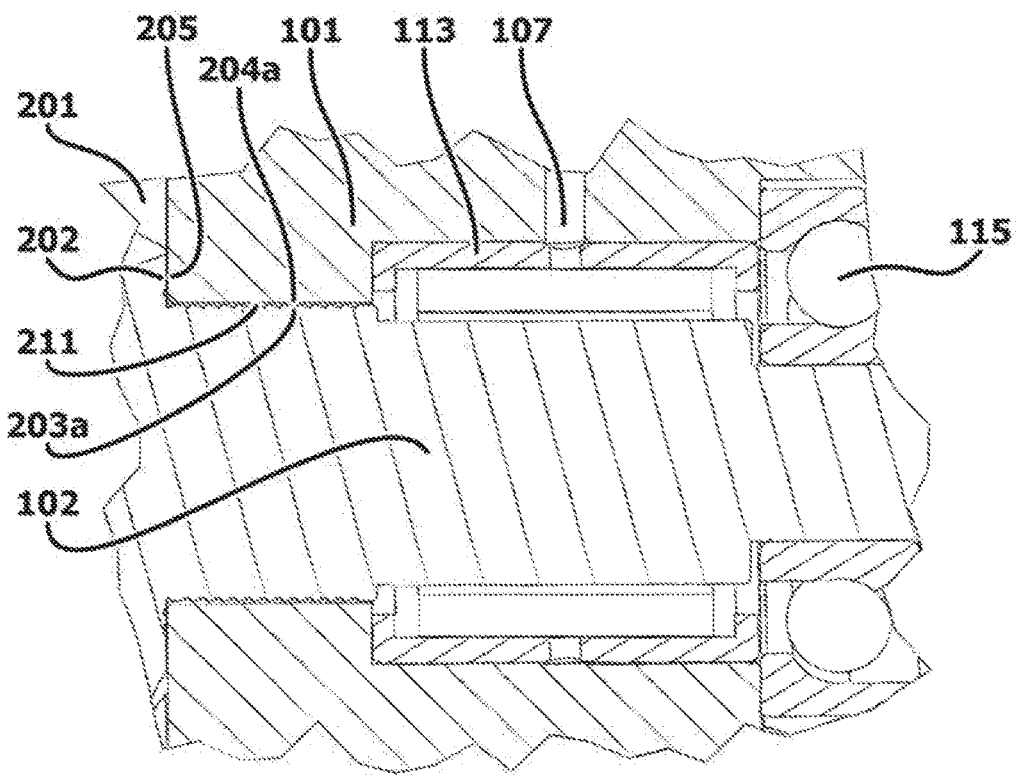
FIG. 5 is an enlarged detail at the top right bearing of FIG. 4 showing one seal and a combination of bearings.

Referring now to FIGS. 3 through 5, a screw compressor 100 of generally known construction is shown in cross-section. Its known components thus not need to be further described in detail so as to focus on the features of our invention. In flooded operation as described above, the gaseous fluid enters the compressor at inlet port 110 where lubricant is introduced. The gas-lubricant mix is compressed to a higher pressure at region 201 that exists for both screws 102, 103 (or inner components) and exits the compressor 100 through a port (not shown), with the lubricant entrained in the gaseous fluid. The gas and lubricant are separated in a conventional external system as schematically shown in FIG. 1 so that only the lubricant enters the compressor housing 101 (or outer component) at port 107 to lubricate components such as bearings 107, 114, 115, 116. It is known that bearing 114 also has a port like that of port 107 for bearing 113, but that bearing port is not shown in these cross-sectional views. This separated lubricant travels through the bearing(s) 107, 114, 115, 116 into a lubricant return system 108 and returns along passage 109 where it is mixed with the inlet gas at 110. The lubricant return system 108 of generally known construction operates at a pressure near to the pressure existing at inlet port 110. Lubricant pressure at port 107 is near to that of the region 201 less friction losses in the lubricant/gas separating system and piping. A pressure difference between the port 107 and the return system 108 moves the lubricant through the bearing(s) 107, 114, 115, 116. Seal arrangements 111, 112 are arranged to block the path of the high-pressure gas-lubricant mix at the region 201 from traveling directly to the return system 108 through gaps between the shafts 102, 103 and the housing 101, thus reducing or eliminating lubricant flow into the bearing(s) at the port 107.

Figure 6:
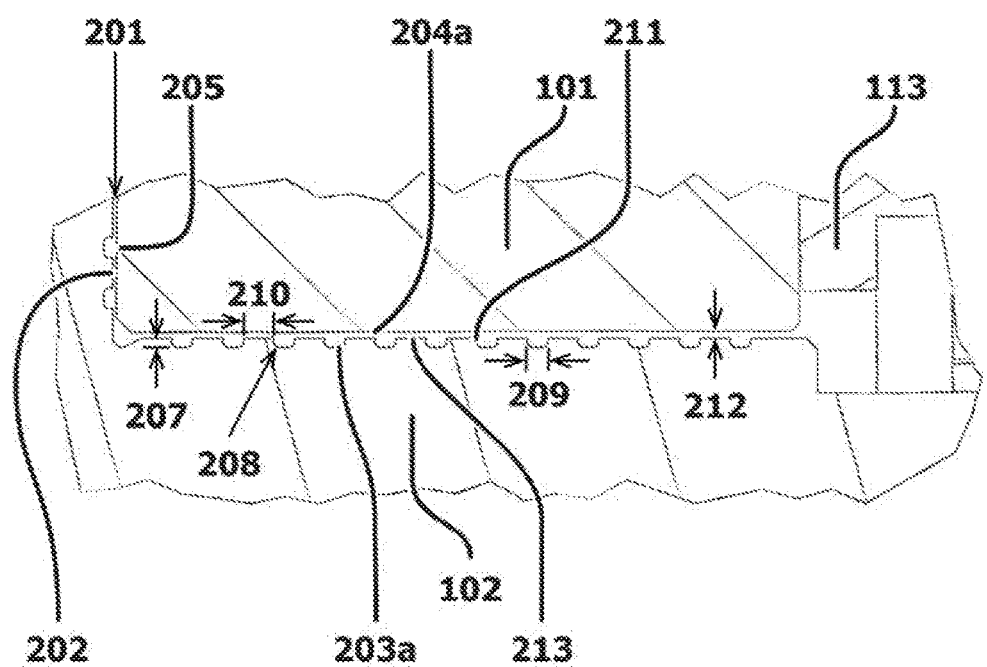
FIG. 6 is an enlarged detail at the top left of FIG. 5 as a schematic view showing one embodiment of the seal of the present invention where the smooth surface is a bore without steps.

We have found that a low friction seal arrangement 111, 112 between the inner and outer components 102, 101, and 103, 101 respectively, is preferred for maximum efficiency because contacting seals wear both the sealing device and mated rotating component, which is exacerbated as the speed difference at the seal increases. In this regard, a non-contacting seal arrangement is deemed particularly desirable in devices with high rotational speeds. FIG. 6 shows one form of our seal arrangement that consists of one smooth or straight surface 204a at the outer component or housing 101 that can be continuously flat as shown to facilitate manufacturing and component assembly, thereby reducing cost. Other forms of this invention can contain any number of stepped smooth surfaces, e.g., two surfaces 204a, 204b as shown in FIG. 7, or utilize a smooth surface of tapered design.

Figure 7:
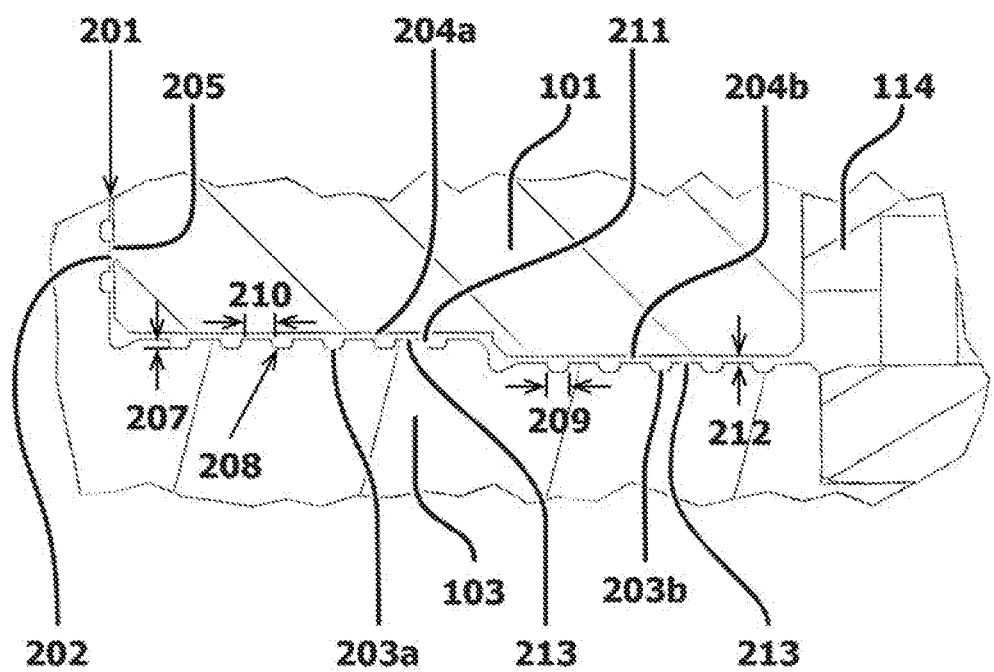
FIG. 7 is an enlarged detail of the bottom right bearing of FIG. 4 as a schematic view showing another embodiment of seal of the present invention where the smooth surface is a bore with one step.

The present invention provides a face seal (202/205) and/or a shaft seal (211/204a) between the inner and outer components 102, 101, respectively as seen in FIGS. 6 and 7. This seal consists of one smooth surface (205/204a) and one opposing surface (202/213) with groove-like features 203a/203b about the center of rotation and spaced along the seal length. The groove features shown in more exaggerated detail in FIG. 6 and FIG. 7 feature a smooth straight bore and grooved shaft diameter. The features can be reversed; that is, a smooth shaft diameter and a grooved bore. This grooved/smooth arrangement can be changed at each radial step in a radially stepped arrangement. A radially stepped arrangement adding a smooth surface 204b adjoining and radially stepped from the smooth or straight section 204a on the outer component or housing 101 and a grooved surface 203b adjoining and radially stepped from the grooved surface 203a on the inner component or shaft 103 is shown in FIG. 7. Additionally, a tapered arrangement containing any number of steps can be formed; however axial motion between the relative components will affect the critical gap distance 212.

The seal design is scaleable, and therefore the dimensions are calculated as ratios of one dimension that is chosen. Typically, component properties, manufacturing processes, and required clearances for the design will define a minimum separation or gap distance 212 between the grooved and smooth components in the assembly. This distance is critical in sealing and should be minimized, making it a reasonable base dimension value to determine groove width 209. The gap 212 being very small in relation to the groove width 209 may cause large fluctuations using a 467% groove 209-to-gap 212 ratio. Using this ratio, a nominal gap 212 of 0.003 inch defines a groove width 209 of 0.014 inch. Manufacturing tolerances can easily stack up to a gap 212 of 0.002 inch to 0.004 inch where groove width 209 would be 0.009 inch to 0.019 inch wherein the groove could be held to 0.012 inch to 0.016 inch. Therefore, a nominal gap distance 212 is referenced to define the groove width 209, whose tolerance should be less than that allowed by the 467% ratio and disclose the labyrinth seal in full with manufacturing tolerances. A groove width 209 of 350%-700% of gap distance 212 is tolerable, wherein the groove width 209 exceeding 600% should be reserved for rotating components over 1.4 inches in diameter.

Our seal pattern provides a uni-directional, non-contacting seal providing a land width 210 which is nominally 134% of groove width 209, groove depth 207 which is nominally 67% of groove width 209, grooves 203a/203b having a flat bottom nominally parallel to the mating smooth surface 204a, 204b, and a corner radius 208 which is nominally 67% of groove depth 207.

A manufacturing process normally requires a tolerance for each feature, thereby defining a size range. Acceptable performance is achieved with our invention where the pattern features two or more grooves 203a/203b where the land width 210 is 125-145% of the groove width 209, the groove depth 207 is 30-50% of the groove width 209, and the corner radius 208 is 25-100% of the groove depth 207. Further performance increases are achieved in manufacturing processes, wherein the edge 211 is retained as a sharp edge and best if a small burr exists extending into the groove width 209.

The present invention is not limited to screw compressors, but may be used with any device that would benefit from a non-contacting seal between rotating components having different operating speeds. Therefore, we do not intend to be limited to the details shown and described in this application but rather seek to protect all such changes and modifications that are encompassed by the scope of our claims.

We claim:
1. A rotary device, comprising:
an outer component,
an inner component configured to rotate relative to the outer component; and
at least one seal arrangement operatively arranged in an axial direction between the inner and outer components to constrain fluid flow there between, the at least one seal arrangement having a smooth surface and an opposing surface with a plurality of radial grooves and lands arranged in the axial direction along a length of the at least one seal arrangement and configured such that the lands are separated from the smooth surface by a predetermined gap and the grooves have a corner radius of 20% to 80% of a depth of the grooves.
2. The device of claim 1 wherein the grooves have a bottom surface substantially parallel to the smooth surface.
3. The device of claim 1, wherein a width of the lands ranges between 100% and 200% of a width of the grooves.
4. The device of claim 1, wherein the depth of the grooves are 20% to 100% of a width of the grooves.
5. The device of claim 1, wherein a width of the grooves are 200% to 600% of the predetermined gap.
6. The device of claim 1, wherein the outer component is a housing having radially stepped surfaces, and the inner component has radially stepped surfaces configured to mate with the radially stepped surfaces on the outer component, with each of the stepped surfaces being provided with one or more of the grooves.
7. The device of claim 6, wherein the width of the grooves is nominally 467% of the predetermined gap and one of the inner component and outer component has a radially stepped sections with a plurality of grooves on each of the sections.
8. A rotary machine, comprising:
an outer component,
an inner component configured to rotate relative to the outer component; and at least one seal arrangement operatively arranged in an axial direction between the inner and outer components to constrain fluid flow therebetween, the at least one seal arrangement having a smooth surface and an opposing surface with a plurality of radial grooves and lands arranged in the axial direction along a length of the at least one seal arrangement and configured such that the lands are separated from the smooth surface by a predetermined gap and the grooves have a bottom surface substantially parallel to the smooth surface, wherein a width of the lands is 125% to 145% of a width of
the grooves, a depth of the grooves is 30% to 50% of the width of the grooves, and a corner radius between the bottom surface of the grooves and side walls of the grooves is 25% to 100% of the depth of the grooves.

9. The rotary machine of claim 8, wherein the width of the grooves is 350% to 700% of the predetermined gap.

10. The rotary machine of claim 8, wherein the outer component is a housing having radially stepped surfaces, and the inner component has radially stepped surfaces configured to mate with the radially stepped surfaces on the outer component, with each of the stepped surfaces being provided with one or more of the grooves.

* * * * *